(12) United States Patent
Chiou et al.

(10) Patent No.: US 9,996,641 B2
(45) Date of Patent: Jun. 12, 2018

(54) THERMAL SIMULATION DEVICE AND METHOD FOR INTEGRATED CIRCUITS

(71) Applicant: National Cheng Kung University, Tainan (TW)

(72) Inventors: Lih-Yih Chiou, Tainan (TW); Liang-Ying Lu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 239 days.

(21) Appl. No.: 14/991,227

(22) Filed: Jan. 8, 2016

(65) Prior Publication Data

US 2016/0203246 A1    Jul. 14, 2016

(30) Foreign Application Priority Data

Jan. 9, 2015   (TW) .............................. 104100829 A

(51) Int. Cl.
*G06F 17/50*         (2006.01)

(52) U.S. Cl.
CPC ................................ *G06F 17/5009* (2013.01)

(58) Field of Classification Search
CPC ............... H02J 17/5009; H02J 17/5022; H02J 17/5027; H02J 17/5036; H02J 17/5045; H02J 2217/80; G06F 17/5009; G06F 17/5022; G06F 17/5027; G06F 17/5036; G06F 17/5045; G06F 2217/80
USPC ........................... 716/106, 133, 136; 703/14
See application file for complete search history.

(56) References Cited

U.S. PATENT DOCUMENTS

| | | | |
|---|---|---|---|
| 2006/0031794 A1* | 2/2006 | Li | ........................ G06F 17/5009 716/111 |
| 2015/0370937 A1* | 12/2015 | Liu | ..................... G06F 17/5036 703/14 |

* cited by examiner

*Primary Examiner* — Paul Dinh
(74) *Attorney, Agent, or Firm* — Muncy, Geissler, Olds & Lowe, P.C.

(57) ABSTRACT

A thermal simulation device for an integrated circuit according to the disclosure comprises a thermal analysis unit and a mesh size analysis unit. The thermal analysis unit performs a thermal analysis of the integrated circuit to obtain temperatures of the center point and boundary of each function block. The mesh size analysis unit determines the cell number in the mesh of each function block. The thermal analysis unit computes a temperature of the center point and boundary of each cell in every function block according to the temperatures of the boundary of each function block.

13 Claims, 9 Drawing Sheets

THERMAL SIMULATION DEVICE AND METHOD FOR INTEGRATED CIRCUITS

CROSS REFERENCE TO RELATED APPLICATIONS

This Non-provisional application claims priority under 35 U.S.C. § 119(a) on Patent Application No(s). 104100829 filed in Taiwan, Republic of China on Jan. 9, 2015, the entire contents of which are hereby incorporated by reference.

BACKGROUND

Technical Field

This invention relates to a thermal simulation device and method and, in particular, to a thermal simulation device and method for integrated circuits.

Related Art

In integrated circuit (IC) design, high power density easily causes a thermal problem. If temperature reasons are neglected in IC design, the reliability of a chip may be reduced a lot, which not only increases power consumption of the chip but also decreases system performance. Therefore, if a thermal analysis can be performed by a thermal simulator during the early period of IC design regarding the influence of the temperature reasons upon the chip, the reliability of the chip can be improved so as to reduce the power consumption and enhance the system performance.

In the conventional art, a thermal simulator mostly uses the following two analysis modes to perform the thermal analysis for the integrated circuit. One is called the thermal analysis of the functional block mode, which performs the thermal analysis in the light of the function block in the integrated circuit. As shown in FIG. 1A, the layout C1 of the integrated circuit is divided into five function blocks C11~C15, and each function block can correspond to a function module. Then, the thermal analysis is performed for the integrated circuit in the unit of a function block, so as to obtain the heat point of each block (every block has a heat point, and the heat point is assumed the center point of the block). However, because the thermal analysis of the function block is performed in the unit of a function block, the accuracy and the precision of the thermal analysis of the chip are not good.

The other kind is called the thermal analysis of the structured mesh mode. As shown in FIG. 1B, the layout C1 of the integrated circuit is divided into regularly arranged meshes C16 (each mesh C16 can correspond, for example, to an element, such as a logic gate), and the thermal analysis is performed for the integrated circuit in the unit of a mesh to obtain the heat point of every mesh C16 (the center point of each mesh is assumed the heat point of the mesh). Although the thermal analysis according to the regular meshes can give the temperature analysis really good accuracy and precision, the regular mesh analysis mode needs the matrix operation to obtain the temperature of every mesh. Accordingly, as the number of the meshes increases, the size of the operational matrix increases with a square multiple and the time for the analysis and operation also increases a lot.

Therefore, it is needed to provide a thermal simulation device and method for integrated circuits, whereby the complexity of the computation of the thermal analysis can be reduced with better accuracy and precision of the thermal analysis.

SUMMARY

An aspect of the disclosure is to provide a thermal simulation device and method for integrated circuits, whereby the complexity of the computation of the thermal analysis can be reduced with better accuracy and precision of the thermal analysis, which can not only reduce the time for the thermal analysis a lot but also reduce the development time and cost of the integrated circuit.

A thermal simulation device for an integrated circuit according to the disclosure comprises a thermal analysis unit and a mesh size analysis unit. The thermal analysis unit performs a thermal analysis of the integrated circuit to obtain temperatures of the center point and boundary of each function block. The mesh size analysis unit determines the cell number in the mesh of each function block. The thermal analysis unit computes a temperature of the center point and boundary of each cell in every function block according to the temperatures of the boundary of each function block.

A thermal simulation method for an integrated circuit according to the disclosure cooperates with a thermal simulation device which includes a thermal analysis unit and mesh size analysis unit. The thermal simulation method comprises steps of: performing a thermal analysis of the integrated circuit by the thermal analysis unit to compute a temperature of the center point of each function block in the integrated circuit; computing temperatures of the boundary of each function block by the thermal analysis unit according to the temperature of the center point of each function block in the integrated circuit; determining the cell number in the mesh of each function block by the mesh size analysis unit; computing temperatures of the boundary of each cell in the mesh of each function block by the mesh size analysis unit according to the temperatures of the boundary of each function block; and computing a temperature of the center point of each cell in the mesh of each function block by the thermal analysis unit according to the temperatures of the boundary of each cell in the mesh of each function block.

In one embodiment, the function blocks correspond to circuit modules of the integrated circuit.

In one embodiment, the thermal analysis unit uses a thermal model in function block mode to perform the thermal analysis, computes the temperature of the center point of each function block and obtains the temperatures of the boundary of each function block according to the temperature of the center point of each function block.

In one embodiment, the temperature of the center point of each function block in the integrated circuit is obtained according to the thermal model of the integrated circuit, the power consumption of each function block, and the ambient temperature.

In one embodiment, the temperatures of the boundary of each function block include the surface temperature of each function block contacting the ambiance, the surface temperature of each function block contacting the adjacent function block, the corner temperature of each function block contacting the ambiance and the corner temperature of each function block contacting the adjacent function block.

In one embodiment, the mesh size analysis unit determines the cell number in the mesh of each function block according to the temperatures of the boundary of each function block and a temperature resolution set by a user.

In one embodiment, the thermal analysis unit obtains the temperature of the boundary of each cell in each function block by an interpolation method.

In one embodiment, the temperature of the center point of each cell in the mesh of each function block calculated by the average in the all temperatures of the boundary of the cell.

Summarily, in the thermal simulation device for integrated circuits and the thermal simulation method of the disclosure, the temperature of the center point of each function block is computed first, and then the temperatures of the boundary of each function block is computed. Then, after determining the optimum cell number in the mesh of each function block, the temperatures of the boundary of every mesh in each function block is computed by using the temperatures of the boundary of each function block, so as to obtain the temperature of the center point of each mesh in each function block. Accordingly, the thermal simulation device for integrated circuits and the thermal simulation method of the disclosure uses the thermal analysis of the hybrid-sized regular mesh mode, so as to divide each function block of the integrated circuit into the regular meshes with different numbers and to derive the temperature of the center point of every mesh. In comparison with the conventional thermal analysis of the function block mode where the thermal analysis is performed in the unit of the function block, the accuracy and precision of the temperature analysis can be greatly enhanced in the disclosure. Moreover, in comparison with conventional thermal analysis of the structured mesh mode, the hybrid structure mode is used in the disclosure to reduce the complexity of the thermal analysis computation and derive the temperature of every mesh without a large-sized matrix operation. Therefore, the disclosure can not only shorten the time for the thermal analysis but also reduce the development time and cost of the integrated circuit.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1A:
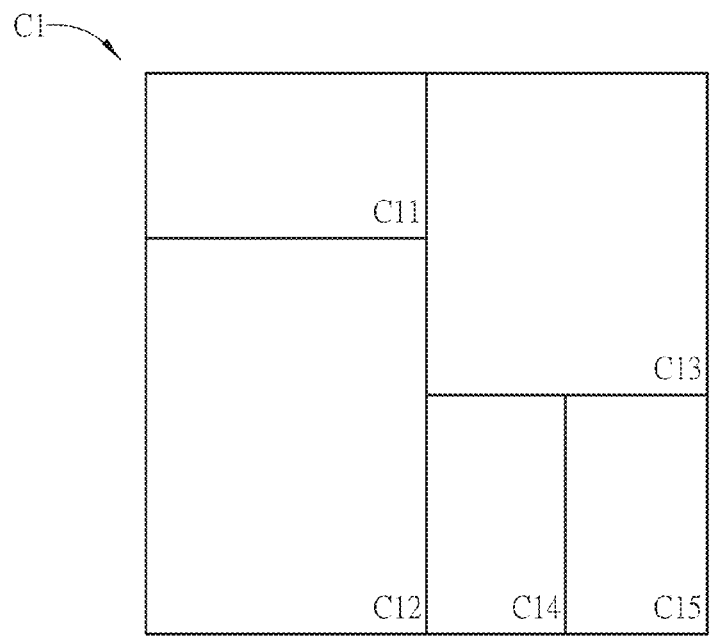
FIG. 1A is a schematic diagram of a thermal analysis of a function block mode in the prior art.
Figure 1B:
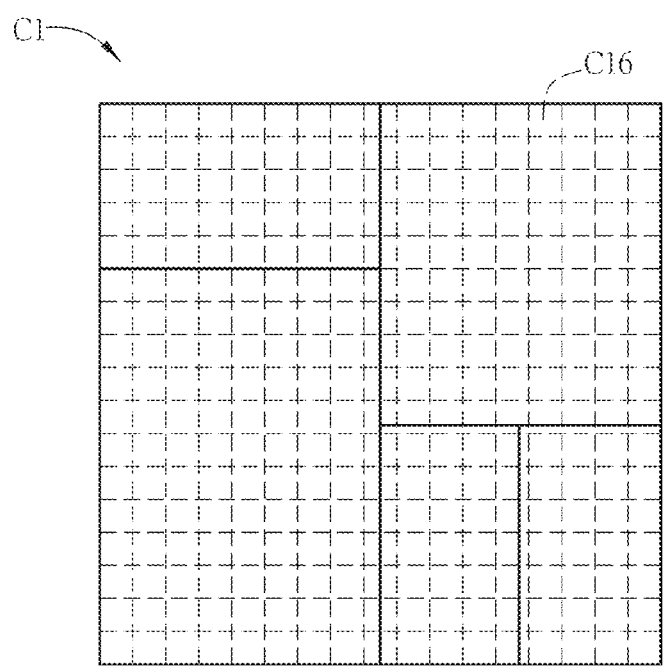
FIG. 1B is a schematic diagram of a thermal analysis of a structured mesh mode in the prior art.
Figure 2A:
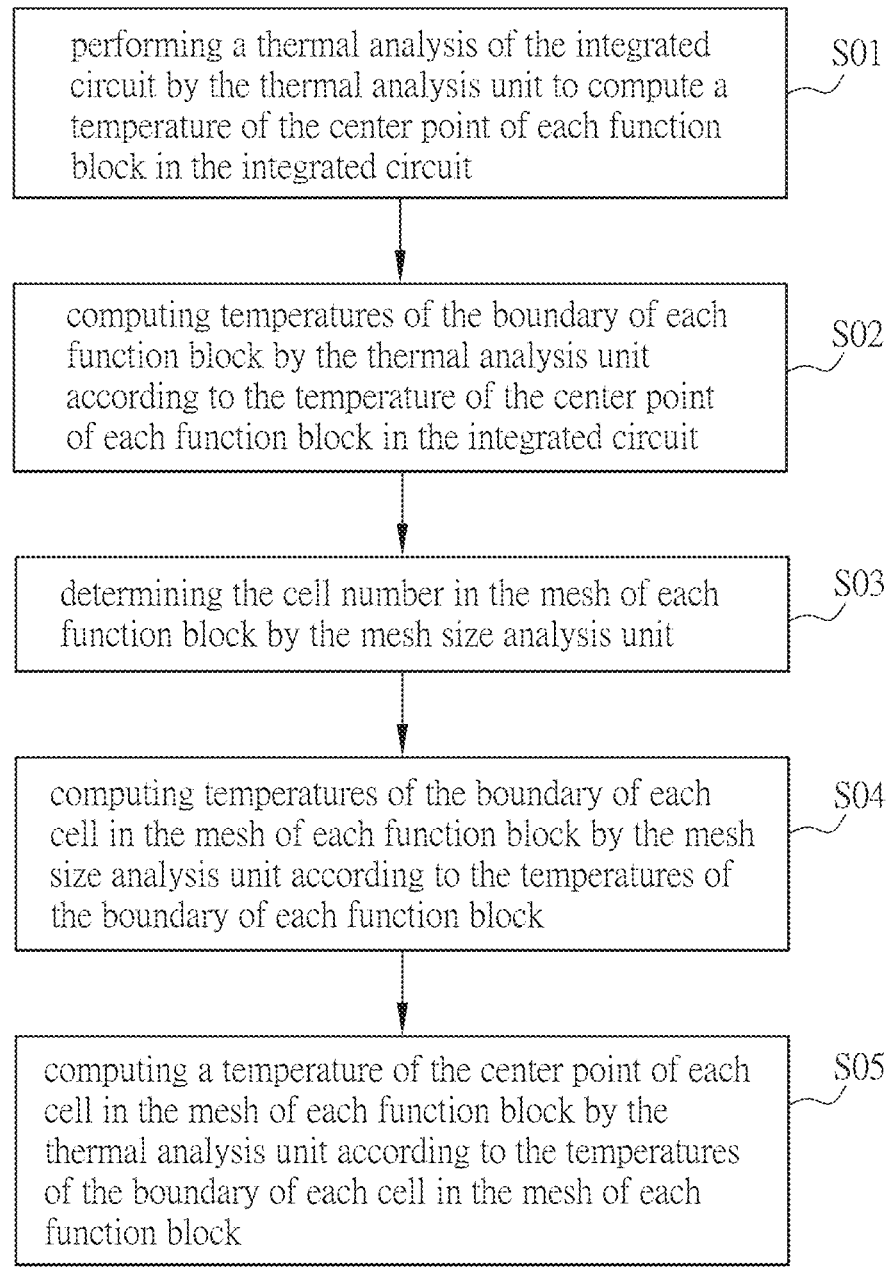
FIG. 2A is a schematic flowchart of a thermal simulation method for integrated circuits of an embodiment.
Figure 2B:
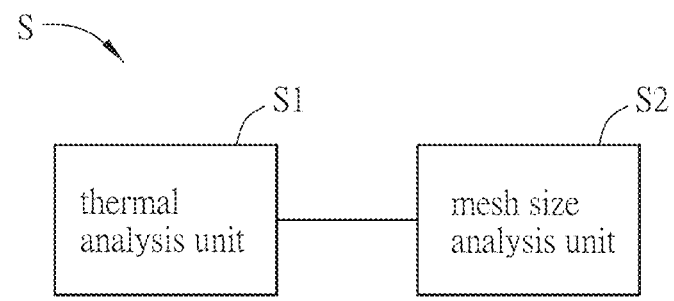
FIG. 2B is a schematic block diagram of a thermal simulation device for integrated circuits of an embodiment.

Refer to FIGS. 2A and 2B, wherein FIG. 2A is a schematic flowchart of a thermal simulation method for integrated circuits of an embodiment, and FIG. 2B is a schematic block diagram of a thermal simulation device S for integrated circuits of an embodiment.

The thermal simulation method for integrated circuits (called the thermal simulation method hereinafter) of the disclosure cooperates with the thermal simulation device S for integrated circuits (called the thermal simulation device S hereinafter) to perform a thermal analysis for an integrated circuit. The layout of the integrated circuit can have a plurality of function blocks, and each function block can correspond to a circuit module. Herein, the circuit module refers to the circuit of the element level, for example an arithmetic logic unit (ALU), a register, etc.

The thermal simulation method of the disclosure includes the steps S01 to S05. The thermal simulation device S includes a thermal analysis unit S1 and a mesh size analysis unit S2. Herein, the thermal analysis unit S1 and the mesh size analysis unit S2 can be carried out by software programs, hardware or firmware.

Figure 3:
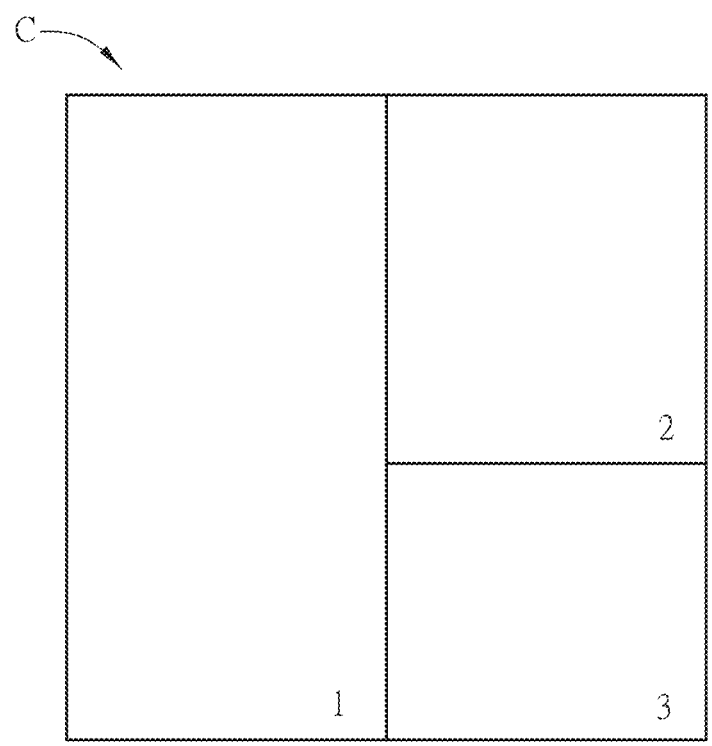
FIG. 3 is a schematic diagram of the layout of the integrated circuit of an embodiment.
Figure 4:
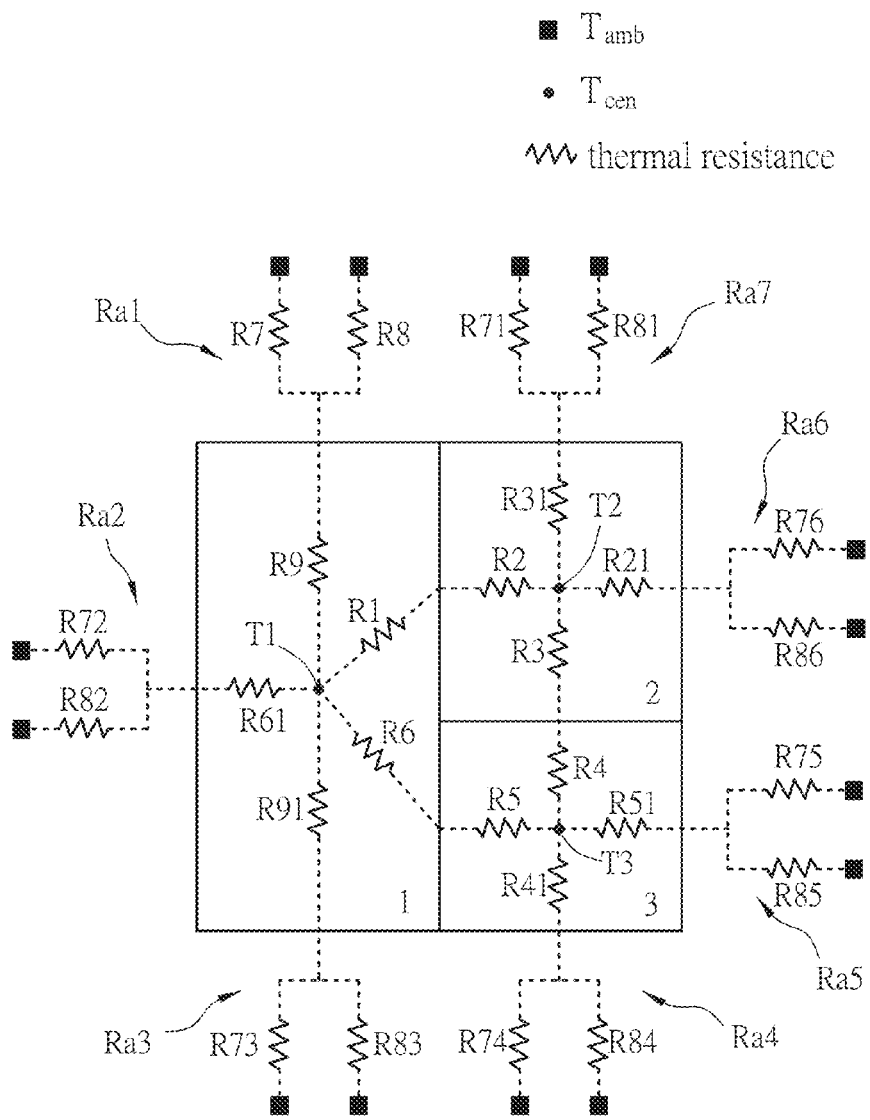
FIGS. 4 to 6 are schematic diagrams of the equivalent circuits of the thermal models of the function block mode of the layout of the integrated circuit in FIG. 3.
Figure 5:
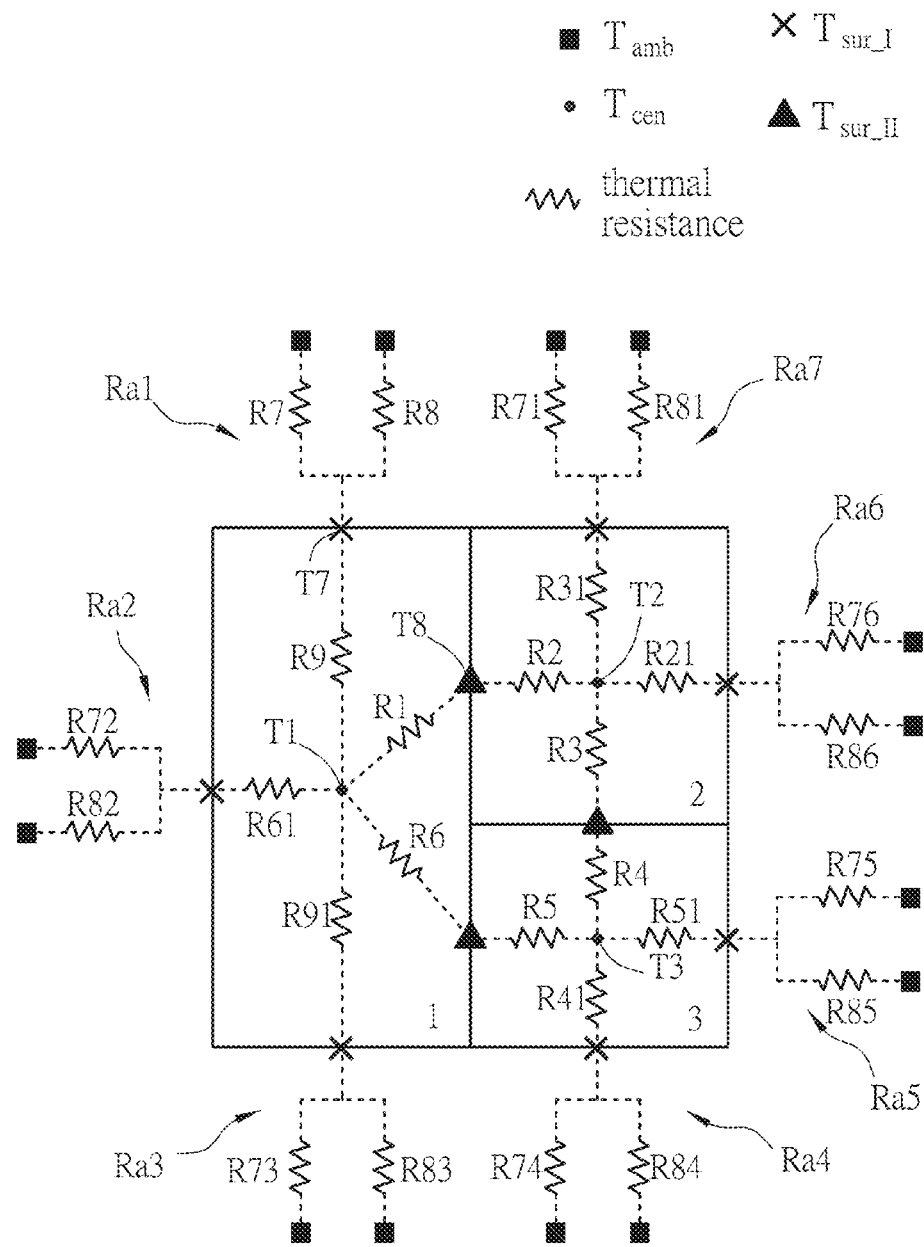
Figure 6:
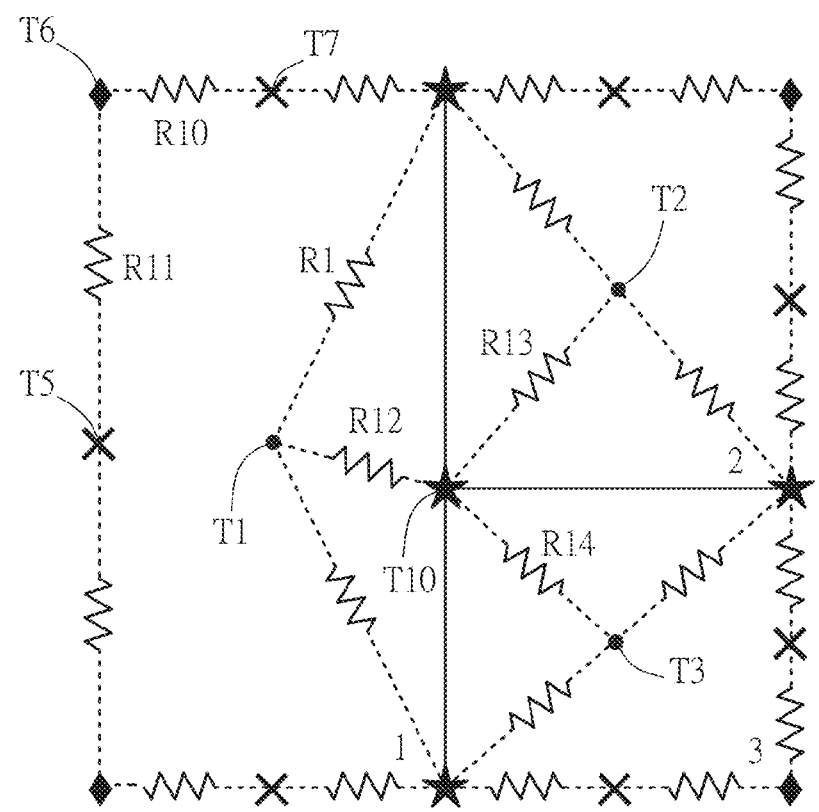

Refer to FIGS. 2A and 2B with FIGS. 3 to 6 to illustrate the functions of the thermal simulation device S and the thermal simulation method of the disclosure. FIG. 3 is a schematic diagram of the layout C of the integrated circuit of an embodiment, and FIGS. 4 to 6 are schematic diagrams of the equivalent circuits of the thermal model in function block mode of the layout C of FIG. 3. Herein, the layout C of FIG. 3 has, for example, three function blocks (marked as 1, 2, 3) in this embodiment.

As shown in FIGS. 2A and 2B, the step S01 is performing the thermal analysis for the plurality of function blocks 1, 2 3 of the integrated circuit by the thermal analysis unit S1 to compute the temperature of the center point of each function block 1, 2, 3. The temperature of the center point is the temperature of the geometric center of the function block. In the step S01 of computing the temperature of the center point of each function block 1, 2, 3, the thermal analysis unit S1 uses a thermal model in function block mode for performing the thermal analysis of the function blocks 1, 2, 3, so as to obtain the temperature of the center point of each function block 1, 2, 3 by the computation. The thermal model in function block mode generally includes six temperature nodes, three thermal resistances and a thermal capacitance. The six temperature nodes are respectively the node of the ambient temperature ($T_{amb}$), the node of the temperature of the center point ($T_{cen}$) of the block, the node of the surface temperature ($T_{sur\_I}$) of the block contacting the ambiance, the node of the surface temperature ($T_{sur\_II}$) of the block contacting the adjacent block, the node of the corner temperature ($T_{cor\_I}$) of the block contacting the ambiance and the node of the corner temperature ($T_{cor\_II}$) of the block contacting the adjacent block. The three thermal resistances can be respectively the conductive thermal resistance ($R_{cond}$), the convective thermal resistance ($R_{conv}$) and the radiative thermal resistance ($R_{rad}$). Or, this embodiment may bring in the thermal model of the so-called hybrid-sized regular mesh mode, which further includes, in addition to the above-mentioned temperature nodes, two new temperature nodes: the node of the temperature of the center point of the mesh ($T_{cen,Cel}$, not shown) and the node of the corner temperature ($T_{cen,Cor}$, not shown).

FIG. 4 shows that the layout C of the integrated circuit in FIG. 3 is changed into the thermal model and then equivalent to a circuit model and then the thermal analysis is given thereon. Herein, the rectangular block symbol denotes the node of the ambient temperature (i.e. Tamb) that has been known and the circular symbol denotes the node of the temperature of the center point ($T_{cen}$, including T1, T2, T3) of the block that is unknown. By the thermal model of FIG. 4, the temperature of the center point T1, T2, T3 of each block 1, 2, 3 can be obtained. Furthermore, FIG. 4 shows the thermal resistance R (i.e. the symbol of the resistance), the ambient thermal resistances outside the chip include R7, R8, R71~R76, R81~R86, the thermal resistances in the function block 1 include R1, R6, R61, R9, R91, the thermal resistances in the function block 2 include R2, R21, R3, R31, and the thermal resistances in the function block 2 include R4, R41, R5, R51. The connection relationship among them is, for example, that the R7 and R8 are connected in parallel and then connected with R9 in series, and the rest connection relationship can be comprehended by referring to the figure. Since those skilled in the art can comprehend the connection relationship among the thermal resistances from FIG. 4, the related illustration is omitted here for conciseness.

Therefore the circuit model of FIG. 4 can be transformed into the matrix operation mode: G×T=P, denoted by the matrix as follows:

$$\begin{bmatrix} G11 & G12 & G13 \\ G21 & G22 & G23 \\ G31 & G32 & G33 \end{bmatrix} \begin{bmatrix} T1 \\ T2 \\ T3 \end{bmatrix} = \begin{bmatrix} P1 \\ P2 \\ P3 \end{bmatrix} + \begin{bmatrix} Pa1 \\ Pa2 \\ Pa3 \end{bmatrix}$$

As above, G is thermal conductivity (i.e. the inverse of the thermal resistance R, because of three function blocks, here is a 3×3 matrix including G11~G33, wherein G11 is the sum of the thermal conductivities of the function block 1, G12 is the thermal conductivity between the function block 1 and the function block 2, G13 is the thermal conductivity between the function block 1 and the function block 3, and so on). T is the temperature of the center point of the block (including T1, T2, T3). P is the power consumption of each block (including P1, P2, P3). Pa is the ambient power consumption, i.e. the virtual power consumption (including Pa1, Pa2, Pa3) of the function block of the chip resulted from the ambient temperature. G can be known by converting the chip layout diagram into the thermal model analysis, P can be known by the software simulation analysis or by measuring the actual chip, $T_{amb}$ is the ambient temperature set by the user for the chip analysis and generally set as the room temperature ($T_{amp}$=25° C.), and the ambient power consumption Pa is a known value.

In this embodiment, the value of G11 is 1/(R1+R2)+1/(R5+R6)+1/(R7//R8+R9)+1/(R72//R82+R61)+1/(R73//R83+R91)(//:parallel connection; +:serial connection), the value of G12 is −1/(R1+R2), the value of G13 is −1/(R5+R6), the value of G21 is the same as G12, and the value of G22 is 1/(R1+R2)+1/(R3+R4)+1/(R71//R81+R31)+1/(R76//R86+R21), and so on. Besides, the value of Pa1 is $T_{amb}$/(Ra1+Ra2+Ra3), the value of Pa2 is $T_{amb}$/(Ra6+Ra7), and the value of Pa3 is $T_{amb}$/(Ra4+Ra5). The value of Ra1 is R9+R7//R8 (i.e. R7 is connected with R8 in parallel and then connected with R9 in series), the value of Ra2 is R61+R72//R82 (i.e. R72 is connected with R82 in parallel and then connected with R61 in series), and so on. Therefore, the temperatures T1, T2, T3 of the center points of the function blocks 1, 2, 3 can be obtained by the thermal conductivity G of the thermal model, the power consumption P of each function block 1, 2, 3 and the ambient power consumption Pa with the above-mentioned matrix operation.

After obtaining the temperatures T1, T2, T3 of the center points of the function blocks 1, 2, 3, the step S02 can be performed as computing the temperatures of the boundary of the function blocks 1, 2, 3 by the thermal analysis unit S1 according to the temperatures T1, T2, T3 of the center points of the function blocks 1, 2, 3. Herein, the temperatures of the boundary are generally called and can include the surface temperature and the corner temperature. Refer to FIGS. 5 and 6, wherein the circuit model of FIG. 5 is the same as FIG. 4 but is added with two symbols: x and ▲, and the circuit model of FIG. 6 is the same as FIG. 4 but doesn't show the thermal resistance of the outside ambiance (e.g. R7, R8, . . . ), the thermal between the function blocks 1, 2, 3 and the outside ambiance (e.g. R9, R61, . . . ) and the node of ambient temperature and is further added with three symbols: x, ♦ and ★.

As shown in FIGS. 5 and 6, each function block 1, 2, 3 has four temperatures of the boundary, which include the surface temperature ($T_{sur\_I}$, denoted by x) of each function block 1, 2, 3 contacting the ambiance, the surface temperature ($T_{sur\_II}$, denoted by ▲) of each function block 1, 2 3 contacting the adjacent function block, the corner temperature ($T_{cor\_I}$, denoted by ♦) of each function block 1, 2, 3 contacting the ambiance and the corner temperature ($T_{cor\_II}$, denoted by ★) of each function block 1, 2, 3 contacting the adjacent function block. The above four temperatures of the boundary $T_{sur\_I}$, $T_{sur\_II}$, $T_{cor\_I}$, $T_{cor\_II}$ can be obtained by the thermal analysis unit S1 through, for example, the following equations:

$T7(T_{sur\_I})=[(T_{amb}×R9)+T1×(R7//R8)]/[R9+(R7//R8)]$, $T8(T_{sur\_II})=(T1×R2+T2×R1)/(R1+R2)$, $T6(T_{cor\_I})=(T7×R11+T5×R10)/(R10+R11)$, $T10(T_{cor\_II})=(T1/R12+T2/R13+T3/R14)/(1/R12+1/R13+1/R14)]$.

To be noted, FIGS. 5 and 6 don't show the all symbols of the thermal resistance and the temperatures of the boundary but show the thermal resistances and the temperatures of the boundary in relation to the above-mentioned thermal analysis equations. Moreover, those skilled in the art should comprehend the all thermal resistances and the temperatures of the boundary with their relationship by the context and FIGS. 4 to 6. Besides, the above equations are just for example and those skilled in the art also can derive the computation of the all temperatures of the boundary ($T_{sur\_I}$, $T_{sur\_II}$, $T_{cor\_I}$, $T_{cor\_II}$) of the function blocks 1, 2, 3 from the above case.

Figure 7:
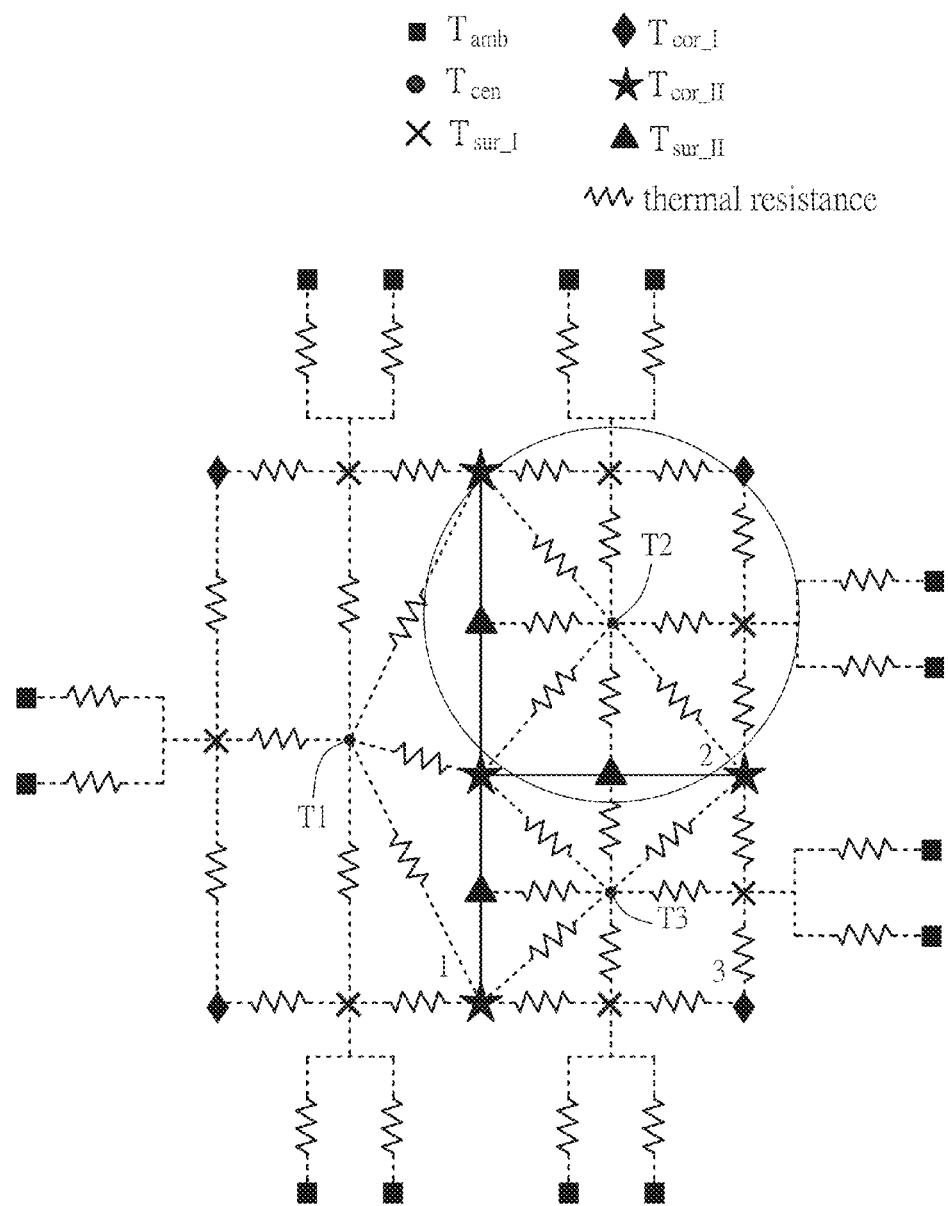
FIG. 7 is a schematic diagram of another equivalent circuit to the thermal model of the function block mode of the layout of the integrated circuit in FIG. 3.
Figure 8A:
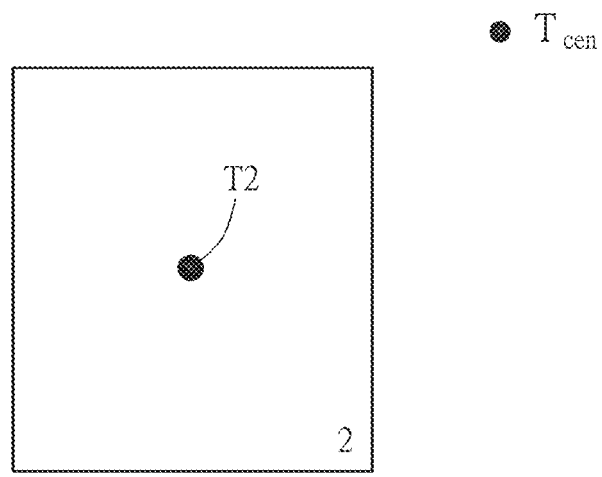
FIG. 8A is a schematic diagram of one of the function blocks in FIG. 7.
Figure 8B:
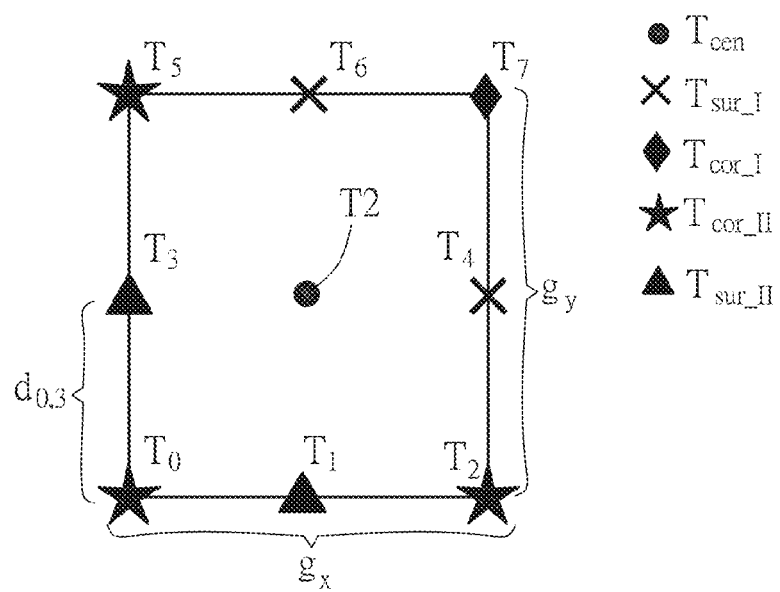
FIG. 8B is a schematic diagram showing the temperature of the center point and the temperatures of the boundary of the function block in FIG. 8A.
Figure 8C:
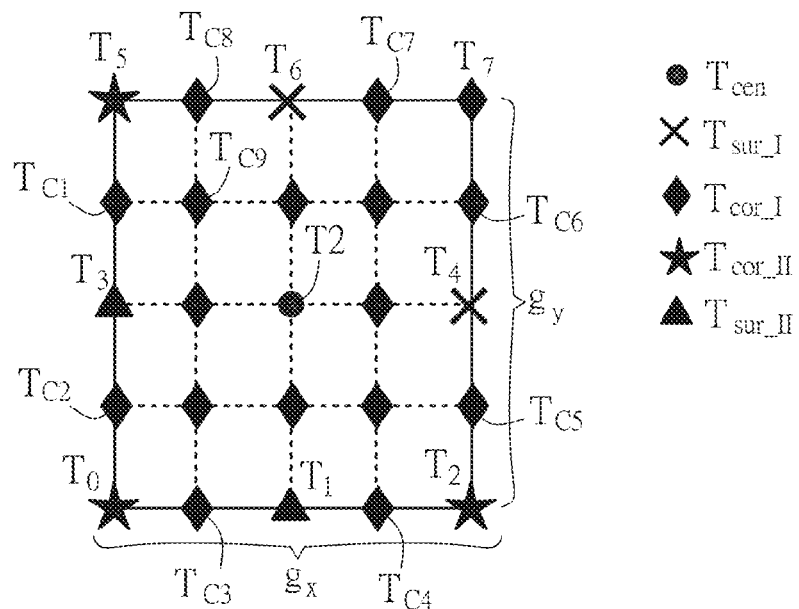
FIGS. 8C and 8D are schematic diagrams showing that the function block of FIG. 8B is divided into a plurality of meshes.
Figure 8D:
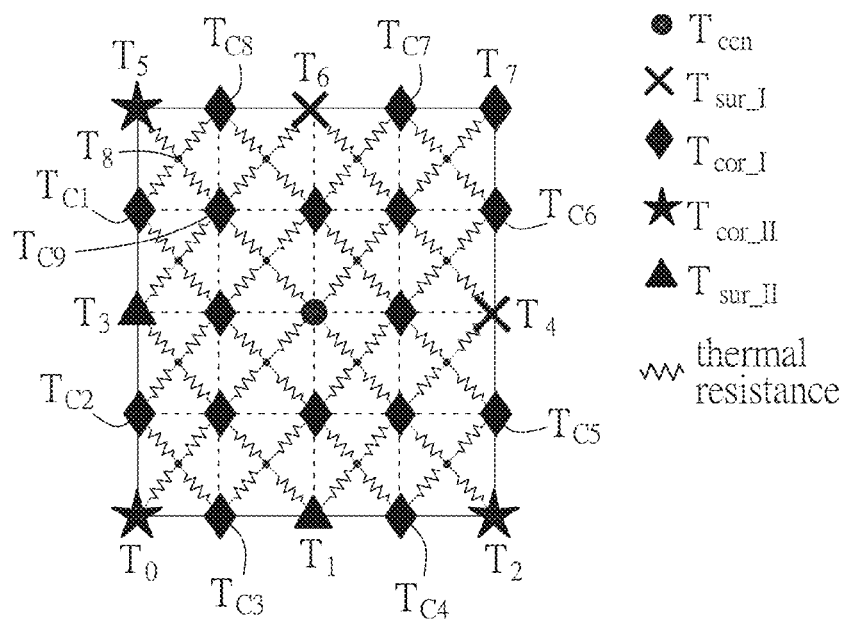

Refer to FIGS. 2A and 2B with FIGS. 7 to 8D, wherein FIG. 7 is a schematic diagram of another equivalent circuit to the thermal model in function block mode of the layout C, FIG. 8A is a schematic diagram of the function block 2 in FIG. 7, FIG. 8B is a schematic diagram showing the temperature of the center point and the temperatures of the boundary of the function block 2 in FIG. 8A, and FIGS. 8C and 8D are schematic diagrams showing that the function block 2 of FIG. 8B is divided into a plurality of cells of the mesh. FIG. 7 shows the all symbols of the thermal resistance and the temperature but doesn't show their codes.

After the step S02 of obtaining the all temperatures of the boundary of the function blocks 1, 2, 3, as shown in FIG. 2, the step S03 is performed as determining the cell number in the mesh of each function block 1, 2, 3 by the mesh size analysis unit S2. Herein, the function block 2 is still taken as an example to illustrate that the optimum cell number in the mesh of the function block 2 is obtained by the above four temperatures of the boundary through the following equations:

$$g_y = \max\left(\frac{\Delta T_{i,j}^y}{d_{i,f}}\right) \times \frac{w_{block}}{Res_T}$$

$$g_x = \max\left(\frac{\Delta T_{i,j}^x}{d_{i,f}}\right) \times \frac{l_{block}}{Res_T}$$

As shown in FIGS. 8B and 8C, $g_y$, $g_x$ are the cell numbers in the mesh of the function block 2 along the perpendicular direction (vertical direction) and the horizontal direction, respectively. By taking the perpendicular direction as an example, it needs to find the maximum temperature density of the perpendicular direction first. Herein, the temperature density of the perpendicular direction is shown as:

$$\frac{\Delta T_{i,j}^y}{d_{i,j}}$$

$\Delta T_{i,j}^y$ is the boundary temperature difference of the function block 2 along the perpendicular direction, such as $T_5$-T, $T_3$-$T_0$, $T_7$-$T_4$, $T_4$-$T_2$. $d_{i,j}$ is the distance of the boundary temperature difference, and for example, the distance of the boundary temperature difference of $T_3$-$T_0$ of FIG. 8B is $d_{0,3}$. The maximum temperature density of the perpendicular direction can be derived from the above equations and then multiplied by the perpendicular length ($w_{block}$) of the function block 2 and divided by the temperature resolution $Res_T$ to obtain the optimum cell number in the mesh of the function block 2 along the perpendicular direction. The temperature resolution $Res_T$ is a known value, i.e. the value of the temperature resolution that the user sets for observing the chip's inside. For example, if the user sets the temperature resolution as 0.1° C., it means the user sets the temperature difference between the adjacent cells in the mesh as basically not over 0.1° C.

In the computation of the cell number in the mesh of the horizontal direction, $\Delta T_{i,j}^x$ is the boundary temperature difference of the function block 2 along the horizontal direction, and the horizontal length of the function block 2 is $l_{block}$. Herein, the computation of the cell number in the mesh of the horizontal direction can be comprehended by referring to the above illustration about the cell number in the mesh along the perpendicular direction, so the related description is omitted here for conciseness. Therefore, the optimum cell number in the mesh of the function block 2 along each perpendicular direction and the horizontal direction can be derived from the above equations.

As shown in FIG. 8C, in this embodiment, the optimum cell number in the mesh of the function block 2 along the perpendicular direction is 4 for example and the optimum cell number in the mesh of the horizontal direction is also 4 for example, so the function block 2 can be divided into 16 cells. Likewise, according to the above equations and illustration, the optimum cell number in the mesh of each function block 1, 3 along each perpendicular direction and the horizontal direction can be obtained, and the related description is thus omitted here for conciseness. To be noted, the function block 2 is divided into 16 cells in the above embodiment, but the number of the cells which the function block 1 or 3 is divided into can be the same as or different from the number of the cells of the function block 2.

Therefore, in the step S03, the cell number in the mesh of each function block 1, 2, 3 is determined by using the temperatures of the boundary (including the surface temperatures $T_{sur\_I}$, $T_{sur\_II}$ and the corner temperatures $T_{cor\_I}$, $T_{cor\_II}$) of each function block 1, 2, 3 and the temperature resolution $Res_T$ that the user sets.

After obtaining the cell number in the mesh of each function block 1, 2, 3, the step S04 is performed as computing the temperatures of the boundary of each cell in the mesh of each function block 1, 2, 3 by the thermal analysis unit S1 using the temperatures of the boundary of each function block 1, 2, 3. Herein, the thermal analysis unit S1 uses an interpolation method to obtain the temperatures of the boundary of each cell in the mesh of each function block 1, 2, 3.

Since the optimum cell number in the mesh of the function block 2 along the perpendicular direction is obtained as 4 and the optimum cell number in the mesh of the horizontal direction is also 4 in this embodiment, the corner temperatures in the mesh contacting the boundary can be derived from the interpolation method. For example, the corner temperatures $T_{C1}$ to $T_{C8}$ (denoted by the rhombus symbol on the boundary) in the meshes of FIG. 8C contacting the ambiance can be obtained by using the corner temperatures $T_0$, $T_2$, $T_5$, $T_7$ (denoted by the star symbol on the four corners) with the interpolation method ($T_{C1}$, $T_{C2}$ can be obtained by using $T_0$, $T_5$ with the interpolation method). Moreover, the corner temperatures in the mesh without contacting the boundary are obtained by using the temperatures of the boundary of the function block 2 with the interpolation method. For example, the corner temperature $T_{C9}$ (and the coroner temperatures on the same row of the horizontal direction) in the mesh on the upper left corner of FIG. 8D can be obtained by using $T_{C1}$, $T_{C6}$ with the interpolation method. Likewise, the corner temperature in the mesh on the same column of the perpendicular direction can be obtained by using $T_{C3}$, $T_{C8}$ with the interpolation method. Therefore, the corner temperature $T_{C9}$ will be given two temperature values, and the final value of the corner temperature $T_{C9}$ is the average of the two temperature values. The rest can be deduced by analogy, so the four corner temperatures (denoted by the rhombus symbol) in the mesh in the function block 2 can be obtained. Likewise, the four corner temperatures in the mesh in the function block 1 or 3 can be obtained.

Finally, the step S05 is performed as computing the temperature of the center point of each cell in the mesh of each function block 1, 2, 3 by the thermal analysis unit S1 using the temperatures of the boundary of each cell in the mesh of each function block 1, 2, 3. The temperatures of the boundary (the corner temperature) of each cell in the mesh of each function block 1, 2, 3 has been obtained in the step S04, and the temperature of the center point of each cell in the mesh of each function block 1, 2, 3 is calculated by the average in the all temperatures of the boundary of the cell. In this embodiment, the temperature of the center point of every cell is derived from the weighted average of the four corner temperatures (the sum thereof divided by 4) of the corresponding mesh in the function blocks 1, 2, 3. For example, T8 is equal to $(T_{C1}+T_{C9}+T_{C8}+T_5)/4$, and so on.

Accordingly, the thermal simulation device for integrated circuits and the thermal simulation method of the disclosure uses the thermal analysis of the hybrid-sized regular mesh mode, so as to divide each function block of the integrated circuit into the regular meshes with different numbers and to derive the temperature of the center point of every cell for representing the heat point of every cell. The optimum cell number in the mesh of every function block can be automatically determined by the temperature resolution parameter set by the user, so as to reduce the unnecessary mesh temperature computation and further to accelerate the thermal analysis. Besides, since the mesh temperature of every function block is given the independence from the mesh temperature of another function block, the parallel computing technology can be used to accelerate the thermal analysis. Therefore, in comparison with the conventional thermal analysis of the function block mode where the thermal analysis is performed in the unit of the function block, the accuracy and precision of the temperature analysis can be greatly enhanced in the disclosure. Moreover, in comparison with conventional thermal analysis of the regular mesh mode, the hybrid structure mode is used in the disclosure to reduce the complexity of the thermal analysis computation and derive the temperature of every mesh without a large-sized matrix operation. Therefore, the disclosure can not only shorten the time for the thermal analysis but also reduce the development time and cost of the integrated circuit.

Summarily, in the thermal simulation device for integrated circuits and the thermal simulation method of the disclosure, the temperature of the center point of each function block is computed first, and then the temperatures of the boundary of each function block is computed. Then, after determining the optimum cell number in the mesh of each function block, the temperatures of the boundary of every mesh in each function block is computed by using the temperatures of the boundary of each function block, so as to obtain the temperature of the center point of each mesh in each function block. Accordingly, the thermal simulation device for integrated circuits and the thermal simulation method of the disclosure uses the thermal analysis of the hybrid-sized regular mesh mode, so as to divide each function block of the integrated circuit into the regular meshes with different numbers and to derive the temperature of the center point of every mesh. In comparison with the conventional thermal analysis of the function block mode where the thermal analysis is performed in the unit of the function block, the accuracy and precision of the temperature analysis can be greatly enhanced in the disclosure. Moreover, in comparison with conventional thermal analysis of the structured mesh mode, the hybrid structure mode is used in the disclosure to reduce the complexity of the thermal analysis computation and derive the temperature of every mesh without a large-sized matrix operation. Therefore, the disclosure can not only shorten the time for the thermal analysis but also reduce the development time and cost of the integrated circuit.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A thermal simulation device for an integrated circuit, comprising:
   a thermal analysis unit performing a thermal analysis of the integrated circuit to obtain a temperature of the center point and boundary temperatures of each function block in the integrated circuit; and
   a mesh size analysis unit determining a cell number in a mesh of each function block according to the boundary temperatures of each function block and a temperature resolution set by a user, the thermal analysis unit computes a temperature of the center point and boundary temperatures of each cell in every function block according to the boundary temperatures of each function block,
   wherein the integrated circuit, after being simulated by the thermal simulation device, is provided for manufacturing.

2. The thermal simulation device as recited in claim 1, wherein the function blocks correspond to circuit modules of the integrated circuit.

3. The thermal simulation device as recited in claim 1, wherein the thermal analysis unit uses a thermal model in function block mode to perform the thermal analysis, computes the temperature of the center point of each function block and obtains the boundary temperatures of each function block according to the temperature the center point of each function block.

4. The thermal simulation device as recited in claim 3, wherein the temperature of the center point of each function block in the integrated circuit is obtained according to the thermal model of the integrated circuit, the power consumption of each function block, and the ambient temperature.

5. The thermal simulation device as recited in claim 1, wherein the boundary temperatures of each function block include the surface temperature of each function block contacting the ambiance, the surface temperature of each function block contacting the adjacent function block, the corner temperature of each function block contacting the ambiance, and the corner temperature of each function block contacting the adjacent function block.

6. The thermal simulation device as recited in claim 1, wherein the thermal analysis unit obtains the boundary temperatures of each cell in each function block by an interpolation method.

7. The thermal simulation device as recited in claim 1, wherein the temperature of the center point of each cell in the mesh of each function block is calculated by the average in the all the boundary temperatures of the cell.

8. A thermal simulation method for an integrated circuit cooperating with a thermal simulation device including a thermal analysis unit and a mesh size analysis unit, the thermal simulation method comprising steps as follows:
   performing a thermal analysis of the integrated circuit by the thermal analysis unit to compute a temperature of the center point of each function block in the integrated circuit;
   computing the boundary temperatures of each function block by the thermal analysis unit according to the temperature of the center point of each function block in the integrated circuit;
   determining a cell number in a mesh of each function block by the mesh size analysis unit according to the boundary temperatures of each function blocks and a temperature resolution set by users;
   computing the boundary temperatures of each cell in the mesh of each function block by the mesh size analysis unit according to the boundary temperatures of each function block; and
   computing a temperature of the center point of each cell in the mesh of each function block by the thermal analysis unit according to the boundary temperatures of each cell in the mesh of each function block,
   wherein the integrated circuit, after being simulated by the thermal simulation device, is provided for manufacturing.

9. The thermal simulation method as recited in claim 8, wherein in the step of computing the temperature of the center point of each function block, a thermal model in function block mode is used to perform the thermal analysis of integrated circuits.

10. The thermal simulation method as recited in claim 9, wherein the temperature of the center point of each function block is obtained according to the thermal model of integrated circuits, the power consumption of each function block, and the ambient temperature.

11. The thermal simulation method as recited in claim 8, wherein the boundary temperatures of each function block include the surface temperature of each function block contacting the ambiance, the surface temperature of each function block contacting the adjacent function block, the corner temperature of each function block contacting the ambiance and the corner temperature of each function block contacting the adjacent function block.

12. The thermal simulation method as recited in claim 8, wherein in the step of computing the boundary temperatures of each cell in each function block, the boundary temperatures are obtained by an interpolation method.

13. The thermal simulation method as recited in claim 8, wherein the temperature of the center point of each cell in the mesh of each function block is calculated by the average in the all the boundary temperatures of the cell.

* * * * *